Aug. 28, 1956  C. H. HARRIS ET AL  2,760,733
WIND SPOOL IMPROVEMENT
Filed July 3, 1953
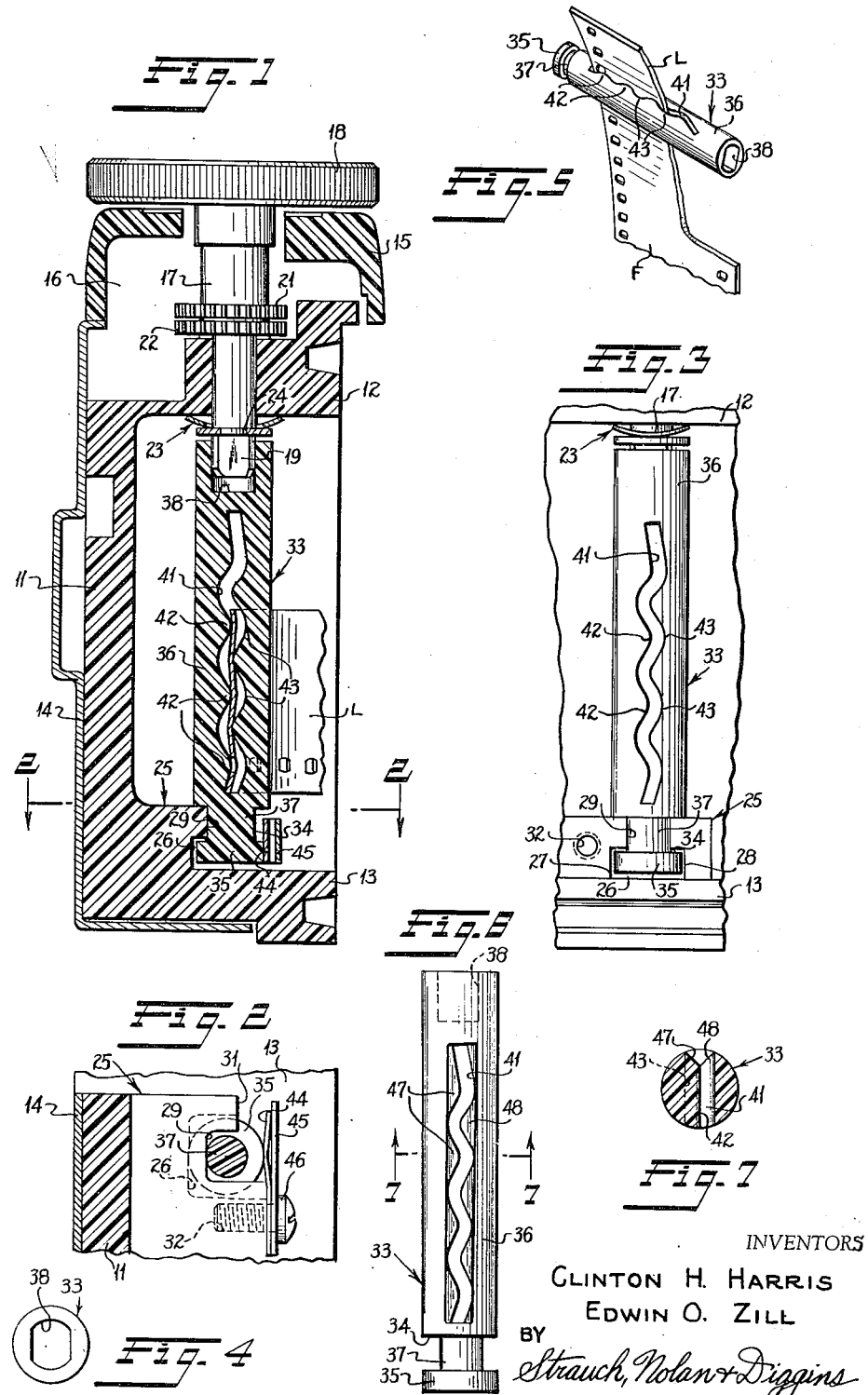
INVENTORS
CLINTON H. HARRIS
EDWIN O. ZILL
BY
Strauch, Nolan & Diggins
ATTORNEYS United States Patent Office 2,760,733
Patented Aug. 28, 1956

2,760,733
WIND SPOOL IMPROVEMENT

Clinton H. Harris and Edwin O. Zill, Ann Arbor, Mich., assignors to Argus Cameras, Inc., Ann Arbor, Mich., a corporation of Michigan Application July 3, 1953, Serial No. 365,810

8 Claims. (Cl. 242—74)

This invention relates to apparatus for winding strip material. It is of particular value in winding photographic film and like stiff slippery strips, and is particularly concerned with a special wind spool construction.

In the preferred embodiment, the invention will be described as embodied in a wind spool for film in a camera wherein 35 mm. or like film strip from a container is wound on the spool during the threading and exposure making operations, and is then rewound into the container for removal from the camera. These wind spools are more or less permanently or securely rotatably mounted in the camera and are not usually intended to be removed except for repair òr replacement. However the wind spool construction is of more general application and may be used to wind other materials as will be shown by the scope of the claims.

The present invention also involves improvements in mounting such a spool in a camera for operative but easily detachable association with the wind shaft manipulated by the operator. The special spool construction facilitates insertion of the leading end of the film strip and assures immediate non-slip gripping of the film strip when the spool is rotated to wind film on it. This latter feature solves a particularly vexing problem in the art since in prior structures the leading ends of the relatively slippery film strip often pulled out even after the back of the camera had been closed, and a considerable length of film was wasted to correct the situation.

It is therefore the major object of the invention to provide novel strip wind spool improvements.

A further object of the invention is to provide a wind spool construction having a novel strip receiving slot.

It is a further object of the invention to provide a wind spool construction of particular form and arrangement for winding film in a camera.

It is a further object of the invention to provide a novel manner of mounting a film wind spool in a camera.

Further objects of the invention will presently appear as the description proceeds in connection with the appended claims and the annexed drawings wherein:

Figure 1 is a section through the housing of a camera showing the film spool of the invention and its mounting in operative association with the wind shaft;

Figure 2 is a fragmentary view in section substantially on line 2—2 of Figure 1 showing how the spool end remote from the wind shaft is mounted on the camera housing;

Figure 3 is a fragmentary plan showing the spool in elevation and the socket formed in the camera housing for receiving the end of the spool;

Figure 4 is an end elevation of the spool showing the shaft receiving recess;

Figure 5 is a generally perspective view showing how the leader strip is thrust into the spool;

Figure 6 is a plan view showing a spool according to a further embodiment of the invention having beveled slot entrance along one side of the spool; and Figure 7 is a section on line 7—7 of Figure 6.

Referring to Figure 1, a camera housing has a front wall 11 and integral top and bottom walls 12 and 13 respectively with light trap recesses around the edges. A front plate 14 is secured over part of the front wall to house and conceal some of the mechanism, and a cap 15 is removably mounted on the housing to enclose a mechanism space 16 above the top wall.

A wind shaft 17 is suitably rotatably mounted in top wall 12 and maintained against axial displacement. The upper end of shaft 17 projects through the cap and has secured to it a knob 18 for rotation by the operator. The lower end of shaft 17 is non-circular at 19 where it projects within the camera housing. Gears 21 and 22 which are mounted on shaft 17 limit axial displacement in one direction, and a plate spring and washer assembly 23 coacting with an annular recess 24 in the shaft resiliently limit axial displacement of the shaft 17 in the other direction.

Suitable mechanism is provided whereby the shaft 17 is normally capable of rotation only in one direction, for winding the film on the spool after each exposure is made, and this mechanism is relasable to permit free reverse rotation of shaft 17 to enable the entire film to be rewound back from the spool after the strip has been fully exposed. Details of this mechanism and the other control mechanism of the camera are however not part of the invention herein and will not be further described, it being understood that the invention contemplates any equivalent control for shaft 17.

Interiorly the housing wall 12 is provided with an integral solid boss 25 formed at its top with an upwardly open socket recess 26 having parallel oppositely facing side channels 27 and 28. Socket 26 is provided with a lateral opening 29 of reduced size at a level such that the bottom of socket provides with the side channels a continuous substantially U-shaped channel adjacent the inner flat surface of wall 12. The outer end of the socket wall is cut away as indicated at 31 for a purpose to appear, and a threaded bore 32 is provided for a spool retainer to be described.

The film wind spool 33 comprises a solid circular cylinder having near one end an annular recess 34 that divides the spool lengthwise into a narrow head 35 and an elongated body 36 spaced by a reduced cylindrical neck 37. The other end of body 36 is formed with an end recess 38 which as shown in Figure 5 is non-circular, having two flat sides and being shaped to fit snugly with the non-circular section 19 of shaft 17 so that shaft 17 and spool 33 always rotate together when assembled.

Spool body 36 is formed with a longitudinal constant width straight-walled slot 41 which is several times as wide as the film and extends substantially diametrally entirely through the spool but which is of zigzag contour along the spool body so as to provide on each side of the slot a series of alternate rounded projections 42 and correspondingly rounded depressions 43 with the projections on each side being opposite and projecting slightly into the depressions at the other side. Slot 41 is preferably uniform about a diametral plane bisecting body 36. Thus when the end of the leader strip L of film F is thrust into slot 41 it will be laterally deformed at all of the points of contact with the projections 42 and will assume a laterally wavy contour. The inherent resiliency of the film and its positive frictional contact with the projections 42 provide a good gripping action which is enhanced when the spool is rotated with the film under tension.

Preferably, the spool is made of a molded plastic such as nylon. The surface of body 36 and the sides of slot 41 are all smooth and the slot edges are smoothly rounded to avoid contact of the film with sharp edges.

In assembly of the camera, with shaft 17 in place and rotated until the flat sides of end 19 are perpendicular to the plane of film travel, the spool element 33 is inserted to telescope end recess 38 over shaft end 19, and then with a sliding pivotal motion the other end of the spool element 33 is dropped toward socket 26 so that head 35 slides into channels 27 and 28 and neck 37 drops into opening 29. The cut away end of the socket at 31 facilitates this operation. Then a retainer is provided for the outer end of the spool. This comprises a crimped leaf spring 44 and relatively stiff plate 45 both secured to boss 25 by a screw 46 which passes through apertures in both into threaded bore 32. This provides spring leaf 44 bearing lightly on the cylindrical periphery of spool head 35 and rigidly backed by plate 45 so that head 35 is positively retained in the socket 26, but its rotation is not appreciably braked since the spring is light and the surfaces in contact are substantially bearing surfaces.

In practice socket 26 may be slightly larger than head 35 and opening 29 may be slightly larger than neck 37, and the small play thus provided does not interfere with the winding operation and it facilitates assembly of spool 33 into the camera.

The axial length of slot 41 is preferably less than that of the width of the film being adapted to accommodate the usual leader strip L, and preferably (see Figure 1) the first projection 42 from the end of the slot nearest neck 37 is located to align with the row of sprocket holes in the leader strip when the strip is inserted with that edge sliding against the end of the slot. This will properly locate the film, and coaction of projection 42 and the sprocket holes will increase the gripping action of the spool on the film.

The spool is preferably made of a light weight inexpensive plastic which is readily molded to desired shape, and which will hold that shape generally under all operative conditions. Its surface is smooth and cylindrical so as not to mar the film and the smooth cylindrical neck 37 provides an effective bearing support of low friction at opening 29. It may be removed or replaced with a minimum of effort merely by removing one screw 46.

A further embodiment of the spool is illustrated in Figures 6 and 7 where a beveled film entrance mouth is provided along slot 41 as by forming equally inclined faces 47 and 48 that converge inwardly of the spool. This facilitates entry of the leader strip end and it also lessens the sharpness of the bend in the first coil of the strip where it emerges from the slot so that film breakage is lessened.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A one-piece wind spool for strip material comprising a solid cylindrical body having a smooth peripheral surface, and a closed end constant width zigzag through slot having smooth parallel side walls extending longitudinally of said body to receive the leading end of a strip to be wound upon said surface.

2. A one-piece wind spool for strip material comprising a solid cylindrical body having a smooth peripheral surface, a closed end constant width zigzag through slot extending longitudinally of said body to receive the leading end of a strip to be wound upon said surface, said slot comprising a plurality of rounded projections on each side and a corresponding plurality of rounded depressions on the other side, each projection being opposite a depression and extending slightly thereinto so that a flat strip end thrust into said slot will be frictionally gripped in said slot, and means on opposite ends of said body for respectively journalling it on a support for rotation about its axis and coupling it with a winding device for effecting such rotation.

3. A one-piece wind spool for strip material comprising a solid cylindrical body of non-metallic material having a smooth peripheral surface, a constant width closed end zigzag through slot extending longitudinally of said body to receive the leading end of a strip to be wound upon said surface, a narrow cylindrical mounting head at one end of the body, a reduced neck integrally joining the body and head, and an axially extending non-circular wind shaft receiving recess in the other end of said spool body.

4. A one-piece wind spool for strip material comprising a solid cylindrical body, a cylindrical head, a cylindrical neck of reduced diameter integrally joining said head and body, and a constant width closed end zigzag through slot extending longitudinally substantially centrally of said body for receiving the leading end of a strip to be wound upon said body, the side walls of said slot being smooth and comprising elements substantially parallel to a diametral plane through the spool, and each side wall being formed with a plurality of rounded projections spaced by rounded depressions with each projection opposite a depression in the other wall and extending slightly thereinto so that the leading end of the strip will be frictionally gripped when thrust into said slot.

5. A one-piece film wind spool for winding film having a leader strip and a row of sprocket holes along one side, a camera comprising a solid cylindrical body, a cylindrical head, a cylindrical neck of reduced diameter integrally joining said head and body, and a constant width closed end smooth-walled zigzag through slot extending longitudinally of said body for receiving the leading end of a film to be wound upon said body, said film having a standard row of sprocket holes along one edge thereof, each side wall of said slot comprising a plurality of rounded projections and an alternate plurality of rounded depressions with the projection nearest said neck being spaced from the adjacent end of the body slot a distance substantially equal to the distance between the sprocket hole row and the adjacent edge of the leader strip in a standard film.

6. A one-piece wind spool for strip material comprising an elongated solid body of non-metallic plastic having a cylindrical surface upon which said strip is to be wound and having a longitudinal non-linear closed end slot of constant width with smooth parallel side walls extending entirely therethrough, and integral bearing and drive coupling formations at the opposite ends respectively of the spool for mounting it for rotation about the axis of said surface and connecting it to a winding device.

7. A one-piece wind spool for strip material comprising an elongated solid body of hard plastic material having a cylindrical surface upon which said strip is to be wound, and integral bearing and drive coupling formations at the opposite ends respectively of the spool body for mounting it for rotation about the axis of said surface and connecting it to a winding device, said body having an elongated closed end through slot extending longitudinally of said body to receive the leading end of a strip to be wound upon said surface, said slot being formed with spaced opposite side projections extending normal to the axis of said body, the projections on opposite sides being alternately disposed and the ends of the projections on one of said sides extending slightly past the ends of the projections on the other of said sides whereby an effective zigzag strip gripping slot is formed in said body.

8. A film wind spool for a camera comprising a one-piece hard molded plastic body having a cylindrical surface upon which a film strip is to be wound and a closed end elongated longitudinal through slot formed with alternate spaced opposite side wall projections that define within the spool body at least adjacent said axis of the body a continuous zigzag slot portion that is adapted to receive and deformably grip the leading end of the film strip.

References Cited in the file of this patent

UNITED STATES PATENTS

| | | |
|---|---|---|
| 230,757 | Dodson | Aug. 3, 1880 |
| 527,365 | Crabtree | Oct. 9, 1894 |
| 643,873 | Hudson | Feb. 20, 1900 |
| 661,504 | Ehlman | Nov. 13, 1900 |
| 1,544,145 | Foothorap | June 30, 1925 |
| 1,704,614 | Johnston | Mar. 5, 1929 |
| 2,468,767 | Lloyd | May 3, 1949 |
| 2,473,337 | Karr | June 14, 1949 |
| 2,614,763 | Horton et al. | Oct. 21, 1951 |

FOREIGN PATENTS

| | | |
|---|---|---|
| 223,464 | Germany | June 25, 1910 |